United States Patent Office 3,809,774
Patented May 7, 1974

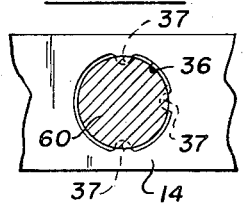
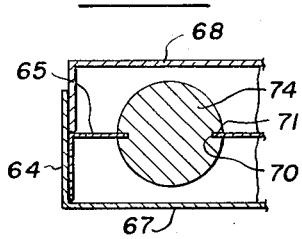
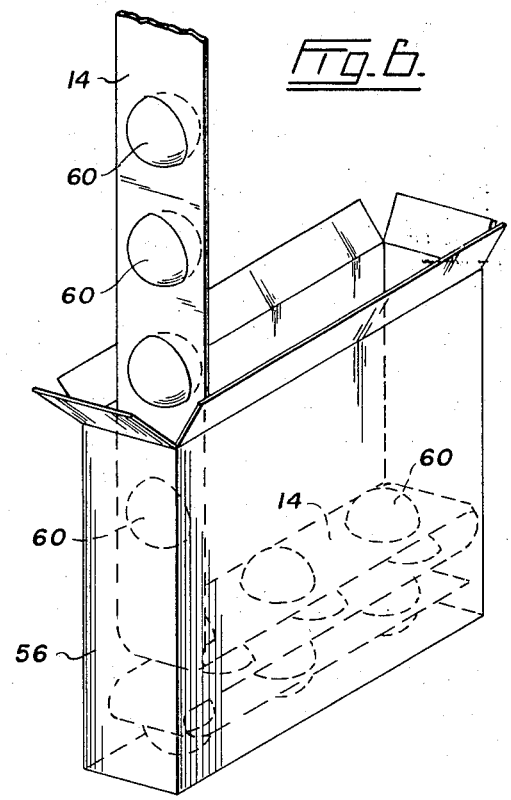
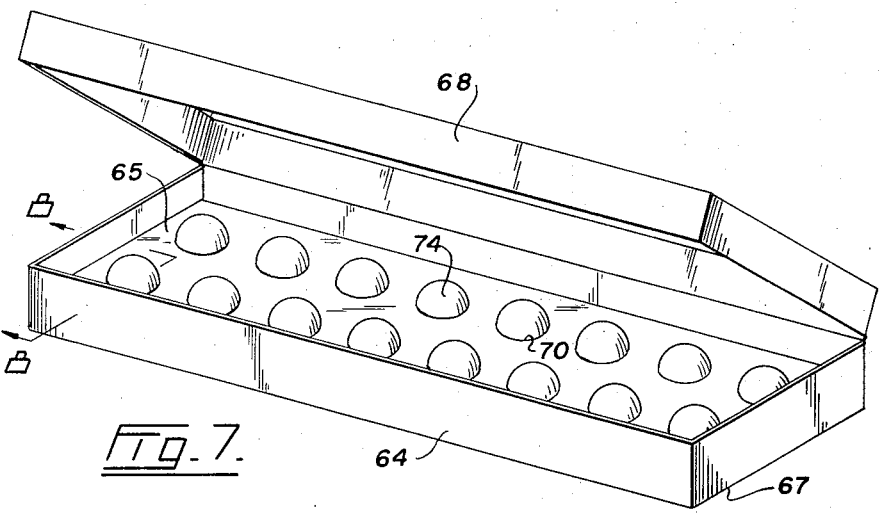

3,809,774
LOADING PROCESS FOR ICE CREAM
CARRIER STRIP
Edward D. Raitt, 5525 Blenheim St., Vancouver 14,
British Columbia, Canada
Filed June 2, 1972, Ser. No. 259,097
Int. Cl. A23g 5/02
U.S. Cl. 426—393                    4 Claims

ABSTRACT OF THE DISCLOSURE

A method of loading a carrier strip with scoops of ice cream including the steps of providing the carrier strip with holes having radial prongs on the side edges thereof, placing the carrier strip between halves of a die each having hemispherical cavities, charging the cavities with ice cream in a fluid state to form scoops within the holes and and with the radial prongs embedded and supporting the scoops, and reducing the temperature of the die to harden the ice cream prior to removal of the carrier strip.

My invention relates generally to a process for loading a carrier with food servings and more particularly to preparing ice cream for automatic dispensing from a machine.

In my copending Canadian patent application S.N. 115,170 for an invention entitled "Hard Ice Cream Dispensing Machine," there is shown a device which will dispense ice cream automatically in response to the closing of a single switch which may be coin operated. This machine utilizes a flexible strip which carries a supply of ice cream scoops stored in a container housed within a refrigerated cabinet. The machine operates to draw the strip from the container and eject a scoop into a discharge chute so that it falls into a waiting biscuit-cone or dish. Such a machine greatly reduces the time required to serve ice cream and therefore effects a considerable saving in labor costs.

The present invention contemplates the process whereby such a carrier strip used by the above described dispensing machine can be mechanically loaded with ice cream scoops in a substantially continuous operation. The scoops are moulded into holes formed in the strip and are supported solely by prongs which can be dislodged quite readily during the dispensing operation with very little, if any, waste of the ice cream.

Figure 1:
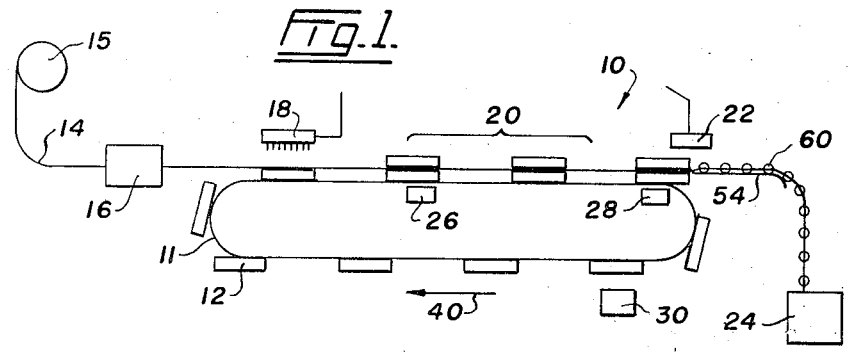
Figure 2:
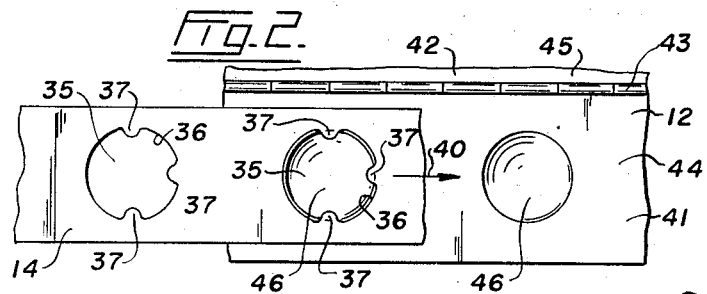
Figure 3:
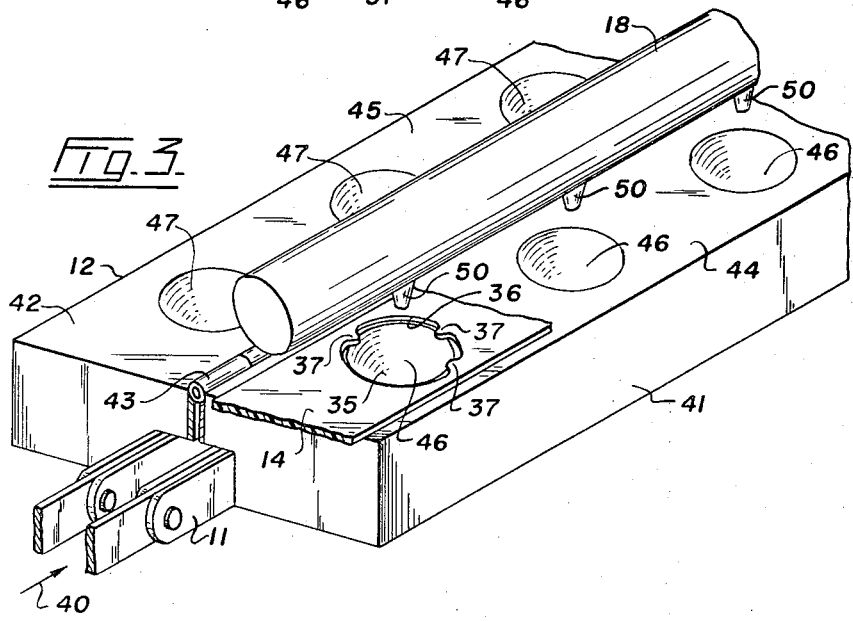
Figure 4:
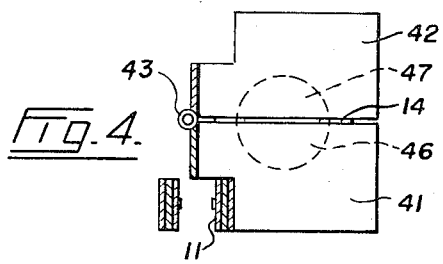

In drawings which illustrate preferred embodiments of the invention,

FIG. 1 is a schematic view of a machine for carrying out a process in accordance with the present invention, FIG. 2 is a fragmentary plan showing a portion of a carrier strip overlapping a portion of a die half, FIG. 3 is a perspective view of an open die with the carrier strip in position over one half of the die located beneath an ice cream dispenser, FIG. 4 is an end elevation of a die in closed position, FIG. 5 is a plan of the carrier strip showing an ice cream scoop in horizontal section, FIG. 6 is a perspective view showing the loaded carrier strip being fed into a carton, FIG. 7 is a perspective view of a modified strip enclosed by a smaller carton, and FIG. 8 is a vertical section taken on the line 8—8 of FIG. 7.

Referring first to schematic FIG. 1 of the drawings, the numeral 10 indicates a typical machine for carrying out the present process, the machine comprising an endless conveyor chain 11 fitted with dies 12. The machine 10 receives a strip 14 from a roll 15 with the strip first passing through a punch 16 before entering beneath an ice cream dispenser 18. A freezing section 20, which is indicated only by brackets in FIG. 1, is provided above the chain 11 and between the dispenser 18 and a heater 22. There is a packaging station 24 near the discharge end of the machine 10 and said machine is provided with suitable mechanism 26 and 28 respectively for closing and opening the dies 12. Also provided near the machine 10, is a die washing station 30.

The strip 14 can be one of a number of suitable flexible materials such as paper or cardboard but preferably four mil polyethylene is used, the material being 3½ inches wide. This plastic material is drawn through the automatically operating punch 16 by the conveyor chain 11 since the strip 14 is clamped between the closed dies 12 on the upper run of the machine 10. Punch 16 operates to stamp out a centrally disposed row of holes 35. As shown best in FIG. 2, each of these circular holes 35 has an edge 36 and projecting inwardly from said edge are semicircular prongs 37. Preferably, three of these prongs are provided and they are spaced 90° apart with two opposing and the third leading the others assuming the conveyor chain 11 operates to draw the strip 14 in the direction of arrow 40, see FIGS. 1, 2 and 3.

Referring now particularly to FIGS. 3 and 4, each of the metal dies 12 will be seen to comprise identical halves 41 and 42 which are connected together by a hinge 43. The bottom half 41 of the die is suitably connected to the conveyor chain 11 and the top half 42 is adapted to fold to the position shown in FIG. 4. Thus, the die halves 41 and 42 have opposing faces 44 and 45 in which rows of hemispherical cavities 46 and 47 are formed, there preferably being eight such cavities in each die half. The center to center spacing of the cavities of each row is the same as the center to center spacing of the holes 35 in the strip. Each cavity has a diameter about ⅛ of an inch smaller than a hole 35 so that the prongs 37 will overhang the cavity when the strip is placed on a die half with the hole in register with the cavity as shown in FIGS. 2 and 5 for example.

Dispenser 18 is designed to extrude ice cream which is in a semi-liquid state at this stage and this flowable material is pumped through depending nozzles 50, see FIG. 3. The vertically disposed nozzles 50 are spaced apart the same distance as the center to center spacing of the cavities 46 (or cavities 47) and there is one such nozzle for each cavity in a die half.

The freezing section 20 is provided with suitable refrigerating equipment (not shown) for quickly reducing the temperature of the dies 12 and their contents as they are moved along slowly and intermittently by the conveyor Chain 11.

Head 22 is adapted to raise the temperature of the dies and their contents only slightly but almost as quickly as the temperature is reduced and, for this purpose, the heater 22 may be provided with a bath-like arrangement (not shown) which will immerse each die in turn in hot water as it moves out of the freezing section 20.

A track 54 is provided at the discharge end of the machine 10 to guide the loaded strip 14 to the station 24 where it is adapted to be packed into cartons such as the one indicated at 56 in FIG. 6.

The mechanism 26 includes an arm (not shown) which will flip the top half 42 of each die over onto its bottom half 41 and this movement is reversed by the similarly operating mechanism 28.

In operation, the machine 10 and its associated parts are intermittently run at appropriately timed intervals to enable the present process to be carried out. The first step in the process, of course, is the preparation of the strip 14 to act as a carrier for ice cream scoops and this is performed by the punch 16 as the strip is drawn off the roll 15, the closed dies 12 providing the necessary gripping engagement between the flexible strip and the conveyor chain 11.

Next, the suitably guided strip 14 is halted momentarily over the bottom half 41 of a die located beneath the dispenser 18 and with eight of the holes 35 in register with a corresponding number of cavities 46. This registration is shown in FIG. 2 and it will be recalled the prongs 37 overhang the hemispherical cavities to the slight extent shown.

The dispenser 18 then operates first to fill the cavities 46 of the die half 41 and then to move across and fill the cavities 47 of the top half 42 of the die.

Now the mechanism 26 is operated as the filled but still open die moves by to flip over the top half 42 and close the die whereupon the strip 14 is held between the two die portions. When the die is closed, the two amounts of ice cream merge to form a spherical scoop 60. FIG. 5 shows a horizontal section of such a scoop 60 which is now attached to the strip 14 and it will be seen that the prongs 37 are embedded in the side of the ice cream ball and that the peripheral surface of the scoop is spaced a short distance (preferably 1/16 of an inch) from the edge 36 of the hole.

Immediately after the die 12 is closed, it is moved on to the freezing section 20 where the eight scoops of ice cream contained in the die are hardened to a state where the product is no longer slightly fluid and therefore the scoops retain their given shape and cannot readily be distorted or dislodged from the strip during subsequent processing or storage.

Next the loaded die passes the heater 22 and is subjected to heat just long enough to free the scoops 60 from the metal sides of the die cavities which originally formed the scoop.

As the die 12 leaves the heater 22, the mechanism 28 operates to flip open the top half 42 of the die whereupon the continuous strip 14 which is now fully loaded with frozen scoops 60 of ice cream passes along the guide track 54 to hang vertically downwards at the packaging station 24.

The dies are cleaned at the washing station 30 and from there are moved along by the conveyor chain 11 to the dispenser end of the machine whereupon the strip loading process is repeated.

The present process includes a procedure for packaging the carrier strip 14 and this can be done by a machine operator manning the station 24. The carrier strip 14 primarily is intended to be packed in the corrugated cardboard or other suitably insulated carton 56 shown in FIG. 6. The person responsible for the packing guides the strip 14 into the carton 56 moving the strip back and forth so that it is accordian-folded in the box as indicated by dotted lines in FIG. 6. When the carton is full, the packer cuts the strip and removes the full box to repeat the packaging process with another carton.

Referring now to FIGS. 7 and 8, the numeral 64 indicates generally another type of carton which may be used to store a slightly modified carrier strip 65. Carton 64 has a base portion 67 and a foldable lid 68. The carrier strip 65 is a relatively narrow band of cardboard in which holes 70 are formed by the punch 16, the side edges of the holes being provided with the same arrangement of radial prongs 71 (FIG. 8 only) as before.

The cardboard strip 65 is loaded with ice cream scoops 74 in the previously described manner and is delivered to the packaging station 24 where it is cut into lengths two of which will conveniently fit into the carton 64 side by side. These cartons 64 are delivered to the retailer who keeps them under refrigeration until a sale is made. It is then a simple matter to take an ice cream scoop 74 out of one of the holes 70 using a fork or other suitable implement and to place that scoop in a biscuit cone or the like.

From the foregoing, it will be apparent the present process provides a quick and easy means for packaging ice cream in scoop form so that the scoops can be served without the need of digging individual servings from a hard frozen container of ice cream as is usually the case. The machine for carrying out the process can be adapted for use in forming ice cream scoops which are not strung on a flexible carrier simply by halting the feed of punched tape 14.

I claim:

1. A process for preparing ice cream for rapid dispensing comprising the steps of forming longitudinally spaced holes in a carrier strip with radial prongs on the side edges of said holes, placing the carrier strip in a die having cavities registering with some of the holes, filling the cavities with semiliquid ice cream to form scoops with the radial prongs embedded in the peripheries of the scoops, reducing the temperature of the die to harden the ice cream prior to removal of the scoop-loaded carrier strip from the die and removing the scoop-loaded carrier strip from the die.

2. A process as claimed in claim 1, and including the additional step of raising the temperature of the die before separation of the carrier strip to release the scoops from the cavities.

3. A process for preparing ice cream for rapid dispensing comprising the steps of punching longitudinally spaced holes in a carrier strip with radial prongs on the side edges of said holes, bringing the carrier strip into juxtaposition with a die half having hemispherical cavities registering with some of the holes, filling the cavities and corresponding cavities of another half of the die with semifluid ice cream, closing the die halves on the carrier strip to form substantially spherical scoops with the radial prongs embedded in the peripheries of said scoops, reducing the temperature of the die to harden the ice cream, later raising the temperature of the die to release the scoops from the cavities prior to separating the carrier strip from said die and separating the carrier strip from said die.

4. A process as claimed in claim 3, and including the additional steps of accordian-folding the scoop-loaded carrier strip into a carton, and cutting the carrier strip when the carton contains the required amount of ice cream.

References Cited
UNITED STATES PATENTS

| 1,859,046 | 5/1932 | Orear | 426—420 |
| 2,045,730 | 6/1936 | Schepman et al. | 426—132 |
| 2,204,495 | 6/1940 | Hogue | 426—393 X |
| 2,890,122 | 6/1959 | Katon | 426—119 X |

FRANK W. LUTTER, Primary Examiner

W. L. MENTLIK, Assistant Examiner

U.S. Cl. X.R.

62—60; 264—251, 259; 426—132, 420, 515